United States Patent
Chesneau

(10) Patent No.: US 11,608,188 B2
(45) Date of Patent: Mar. 21, 2023

(54) HYBRID PROPULSION FOR AN AIRCRAFT

(71) Applicant: SAFRAN, Paris (FR)

(72) Inventor: Gaetan Chesneau, Moissy-Cramayel (FR)

(73) Assignee: SAFRAN, Paris (FR)

( * ) Notice: Subject to any disclaimer, the term of this patent is extended or adjusted under 35 U.S.C. 154(b) by 428 days.

(21) Appl. No.: 16/968,194

(22) PCT Filed: Feb. 8, 2019

(86) PCT No.: PCT/FR2019/050284
§ 371 (c)(1),
(2) Date: Aug. 7, 2020

(87) PCT Pub. No.: WO2019/155173
PCT Pub. Date: Aug. 15, 2019

(65) Prior Publication Data
US 2021/0039802 A1 Feb. 11, 2021

(30) Foreign Application Priority Data
Feb. 9, 2018 (FR) ..................................... 1851124

(51) Int. Cl.
*B64D 33/02* (2006.01)
*B64D 35/02* (2006.01)
*F02C 7/36* (2006.01)

(52) U.S. Cl.
CPC ............ *B64D 33/02* (2013.01); *B64D 35/02* (2013.01); *F02C 7/36* (2013.01);
(Continued)

(58) Field of Classification Search
CPC ..... B64C 29/0033; B64C 27/28; B64C 27/52; B64D 33/02; B64D 35/02;
(Continued)

(56) References Cited

U.S. PATENT DOCUMENTS

| 3,273,654 A | 9/1966 | Pinnes | |
|---|---|---|---|
| 2016/0200436 A1* | 7/2016 | North | B64D 27/24 244/7 R |

(Continued)

FOREIGN PATENT DOCUMENTS

| EP | 3130783 A1 | 2/2017 |
|---|---|---|
| EP | 3135922 A1 | 3/2017 |

(Continued)

OTHER PUBLICATIONS

Search Report issued in French Patent Application No. 1851124 dated Oct. 25, 2018.

(Continued)

*Primary Examiner* — Todd E Manahan
*Assistant Examiner* — David P. Olynick
(74) *Attorney, Agent, or Firm* — Pearne & Gordon LLP

(57) ABSTRACT

Hybrid propulsion is obtained by arranging, around a conventional turbomachine, a reversible electric machine linked to the low-pressure shaft via a mechanical movement transmission, a one-way clutch being arranged on the low-pressure shaft between the fan and a low-pressure compressor. The low-pressure shaft includes two aligned portions which can be separated and reconnected. A casing includes a first portion able to tilt around a horizontal transverse axis of the aircraft relative to a second portions of the casing. One portion of the low-pressure shaft, the fan and the reversible electric machine are mounted on the first portion of the casing, and the other portion of the low-pressure shaft is mounted on the second portion of the casing. This device facilitates electric taxiing of the aircraft, using the machine as a motor, whereas the rear of the low-pressure shaft remains stationary.

7 Claims, 6 Drawing Sheets

(52) U.S. Cl.
CPC ............... *B64D 2033/0286* (2013.01); *F05D 2220/323* (2013.01); *F05D 2240/60* (2013.01)

(58) Field of Classification Search
CPC ...... B64D 2027/026; B64D 2033/0286; F02C 7/36; F05D 2240/60; F05D 2220/323; F02K 1/08
See application file for complete search history.

(56) References Cited

U.S. PATENT DOCUMENTS

| | | | |
|---|---|---|---|
| 2018/0057159 A1* | 3/2018 | Ivans | B64C 11/00 |
| 2018/0251226 A1* | 9/2018 | Fenny | F01D 15/10 |
| 2020/0148347 A1* | 5/2020 | Bevirt | B64C 11/46 |

FOREIGN PATENT DOCUMENTS

| | | | |
|---|---|---|---|
| WO | 91/17083 A1 | 11/1991 | |
| WO | 2010/067172 A2 | 6/2010 | |
| WO | 2016/020618 A1 | 2/2016 | |

OTHER PUBLICATIONS

International Search Report issued in Application No. PCT/FR2019/050284 dated May 24, 2019.
Written Opinion for PCT/FR2019/050284 dated May 24, 2019.

\* cited by examiner

HYBRID PROPULSION FOR AN AIRCRAFT

This is the National Stage of PCT international application PCT/FR2019/050284, filed on Feb. 8, 2019 entitled "HYBRID PROPULSION FOR AN AIRCRAFT", which claims the priority of French Patent Application No. 1851124 filed Feb. 9, 2018, both of which are incorporated herein by reference in their entirety.

The subject of this invention is primarily a hybrid propulsion for an aircraft, and then particular propulsion methods making use of this device.

Aircraft performances can be expressed by characteristics consisting particularly of the thrust, radius of action for a determined total mass, and by takeoff and climb performances (required runway length and rate of climb). The principal requirements are different for different operating conditions, particularly between the cruising speed and transient conditions. Therefore hybrid propulsions have already been disclosed to modify the performances of conventional turbomachines in some circumstances, by combining them with electrical machines.

Several designs have already been disclosed; some are described in document WO 2016/020618 A, that describes how the addition of electrical machines (motors or generators) can inject additional power to the high pressure shaft or the low pressure shaft, or on the contrary can draw power from them, that is transformed into electricity for aircraft loads (equipment and ancillaries), or to recharge a battery, the energy of which can then be restored to the turboengine through an electric motor; power transfers from the high pressure shaft to the low pressure shaft are also possible. Fine adjustment of the powers output by the high pressure shaft and the low pressure shaft can improve the efficiency of the machine, particularly to optimise the pumping margin of the compressors.

In one particular design presented in this document, energy of a turbomachine intake fan is exploited in a "self-rotation" condition, when the turbomachine is off, by disengaging the fan from the other parts of the low pressure shaft and transforming its mechanical self-rotation energy into electrical energy making use of a generator placed between the fan and the clutch at the end of the corresponding shaft. But in particular, this particular device cannot improve the performances of engines during takeoff and when climbing. There are disadvantages in the use of a conventional clutch, released and engaged at will by a control device and an actuator, due to the additional weight introduced by it.

WO 2010/067172 A2 describes a turbomachine shaft equipped with a fan that can be disengaged from the portion containing the compressors and the turbines, and associated with a reversible electrical machine.

Therefore one purpose of the invention is to improve the aircraft performances in general, making use of a simple device and requiring a lower weight increase than known hybrid propulsion devices.

In its general form, the invention relates to a hybrid propulsion device for an aircraft, comprising a turbomachine on which a low pressure shaft is installed, the low pressure shaft carrying a fan located at the air turbomachine intake, a reversible electrical machine associated with the low pressure shaft by a mechanical movement transmission, a clutch located on the low pressure shaft between the fan and a low pressure compressor, characterised in that the low pressure shaft is composed of two separable and reconnectable portions prolonging each other, the device comprises a case composed of two portions, a first of said portions of the case is free to tilt about a horizontal transverse axis of the aircraft relative to a second of said portions of the case, one of said portions of the low pressure shaft, the fan and the reversible electrical machine are mounted on the first portion of the case, and the other of said portions of the low pressure shaft is mounted on the second portion of the case.

This arrangement makes an additional propulsion possible through the fan independently of the operation of the principal turbomachine. The device is also simple and lightweight. In particular, it is important to mention the advantage of the single-directional clutch, lighter in weight than a normal clutch that does not require a control system or an actuator and enables normal solidarisation of the low pressure body and the fan during ordinary circumstances, while making it possible to use the fan alone or independently of the remainder of the engine when necessary to supply purely electrical thrust if it is required that the engine is stopped (electrical taxiing by the fan) on the ground, purely electrical flight when possible) or not (failure of the turbomachine in flight). Despite its simplicity, the device conforming with the invention enables the principal hybrid operating modes available with more complicated devices, and particularly taking off power on one of the two shafts, the supply of power to the high pressure body or the transfer of power between the two shafts.

Construction of the invention is such that the direction of the fan can be oriented independently of the remainder of the aircraft and can for example, procure a larger vertical component of the thrust, particularly useful at the time of takeoff.

Advantageously and according to various optional and independent possibilities, the clutch is a passive free-wheel device; the ratio between the speed of the two parts of the shaft separated by the clutch and that controls the change of state of the clutch is equal to 1 (this ratio can be modified by adding a gearbox to the clutch, increasing the weight of the device with the hope of improving performances if the fan turns at a lower speed than the rest of the low pressure body); the second reversible electrical machine is associated with the same battery as the first through the electrical connection, also to simplify the device, the two machines then being indifferently capable of drawing off energy from the battery or restoring energy to it; and the first and the second mechanical movement transmissions comprise mainly gears.

According to another optional but important characteristic of the device, the second reversible electrical machine is completely separate from the high pressure shaft, and the first and the second mechanical movement transmissions do not have any uncoupling means.

By associating each electrical machine with a single corresponding shaft of the turbomachine, the number of transmissions is lower and they can be very much simpler. It is then also possible and advantageous to construct them without any element enabling selective uncoupling of an unused transmission: the lack of these elements and their control means can reduce the aircraft weight while avoiding risks of accidents if these elements or their actuators fail to function correctly.

Another particular construction by which the fan has variable pitch blades and inversion of the thrust direction, can artificially reduce the thrust when the turbomachine has to remain on, by thrust inversion made on the fan alone, which is advantageous to make an air brake mode during descent, while drawing off power by the electrical machines would make it necessary to reduce the shaft rotation speed.

The invention will now be described with reference to the following figures.

Figure 3:
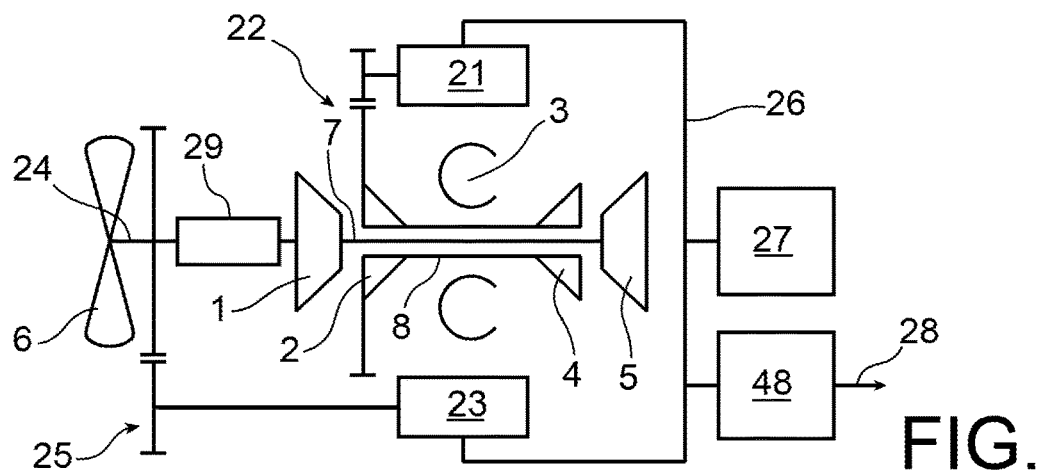
Figure 11:
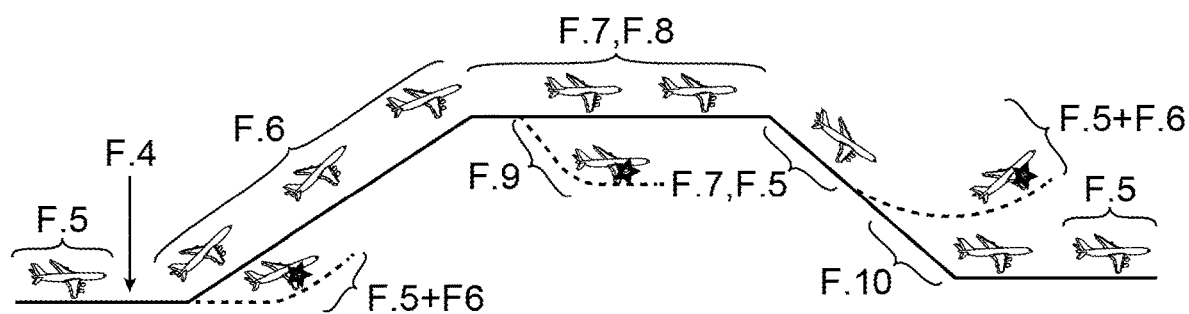

FIG. 3 partially illustrates the device according to the invention;

FIGS. 4, 5, 6, 7, 8, 9 and 10 illustrate different operating modes of the device;

FIG. 11 is a flight diagram illustrating the different modes; and

Figure 12:
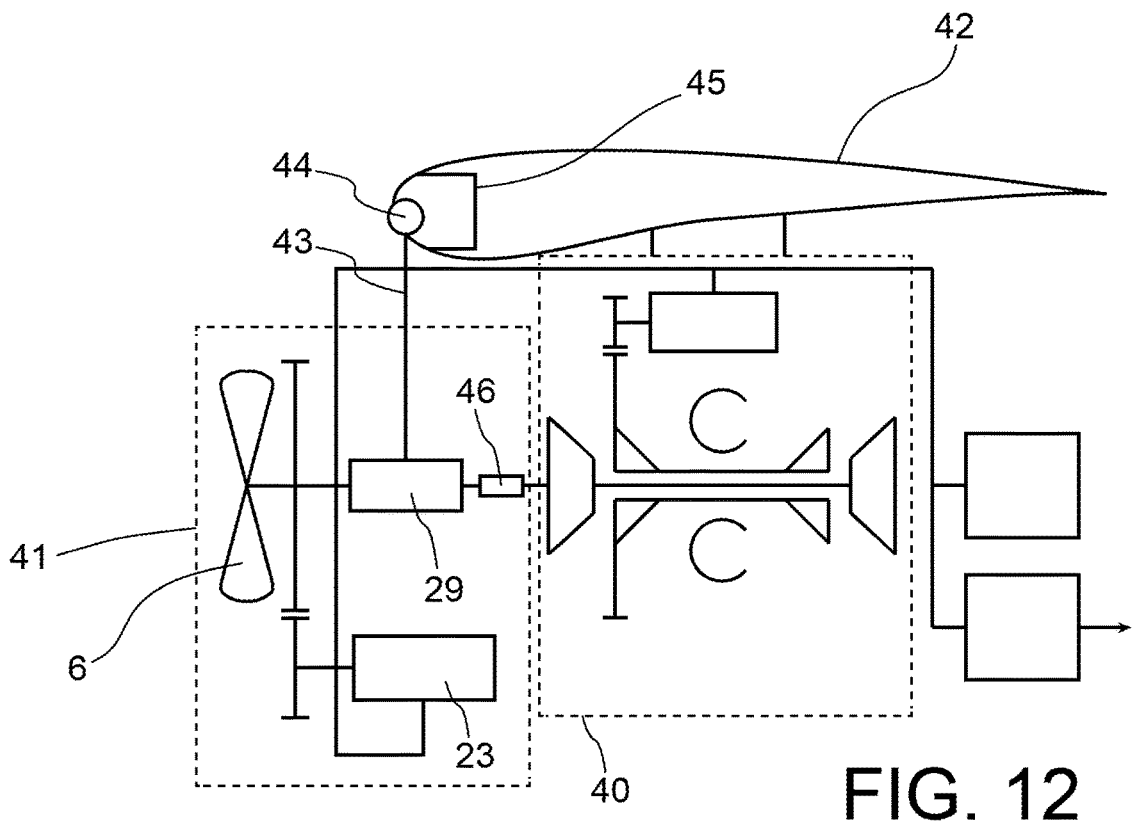
Figure 13:
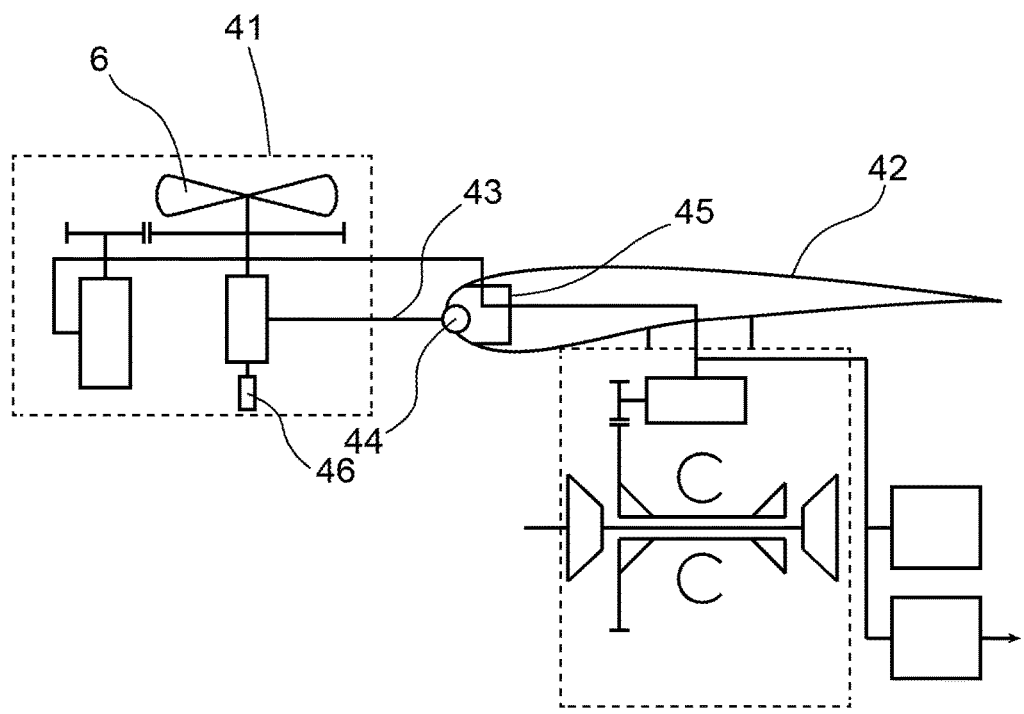
Figure 14:
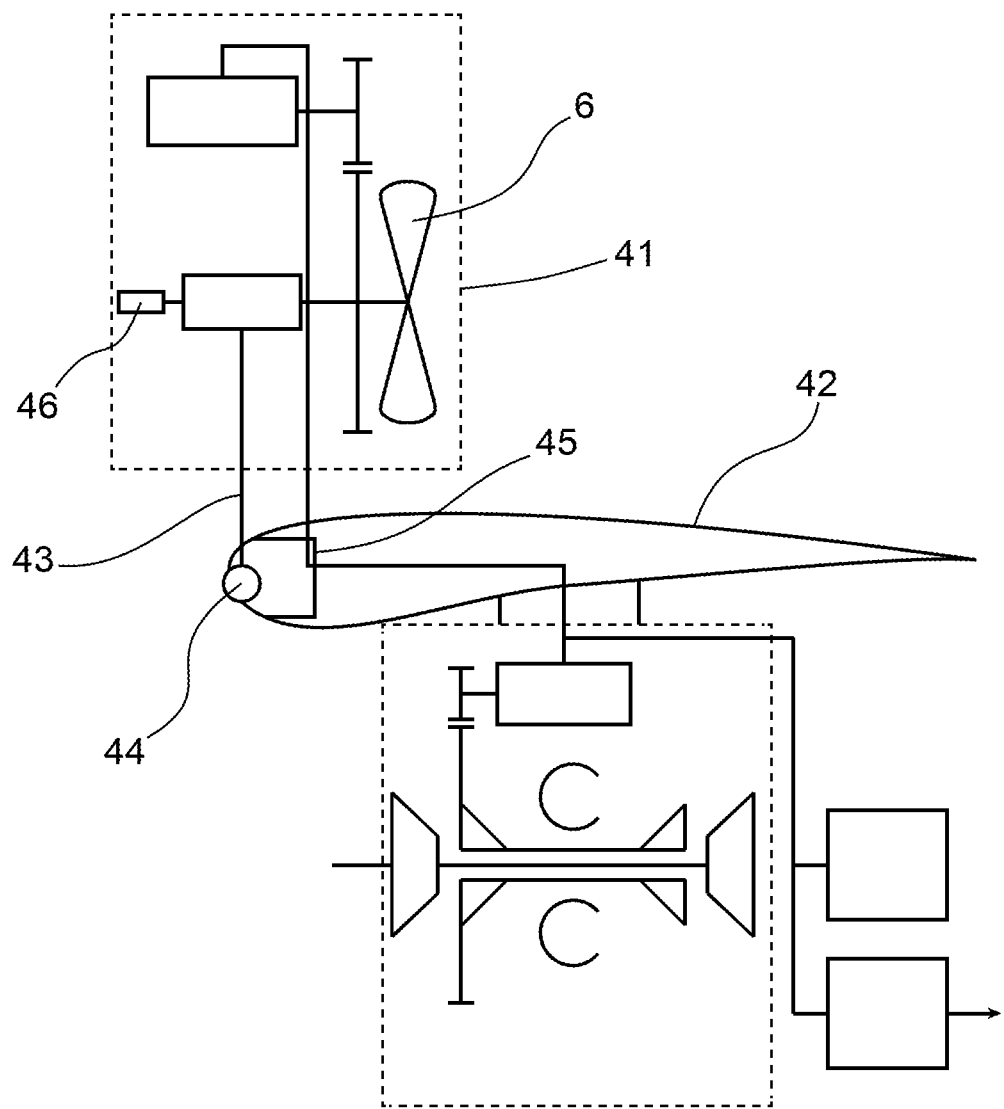

FIGS. 12, 13 and 14 illustrate the construction specific to the invention.

Figure 1:
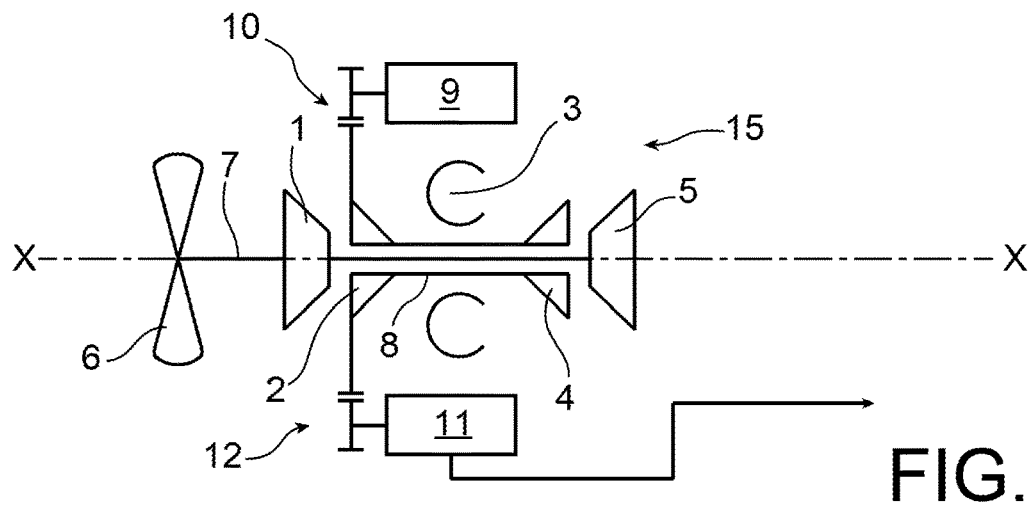
FIG. 1 is a diagrammatic view of a usual propulsion device, not allowing a hybrid propulsion.

Refer to FIG. 1. A conventional propulsion device very diagrammatically comprises a low pressure compressor 1, a high pressure compressor 2, a combustion chamber 3, a high pressure turbine 4, and a low pressure turbine 5 aligned in sequence along an X-X axis of the engine from the forward end to the aft end of the aircraft. However, the alignment can be complemented by a fan 6 located forward from the low pressure compressor 1 and composed of larger diameter blades. The engine may be a turbojet, if the fan 6 is ducted like the rest of the engine, or a turboprop if the fan 6 is not ducted. A low pressure shaft 7 supports the blades of the fan 6 and the mobile blades of the low pressure compressor 1 and the low pressure turbine 5 to form a low pressure body; and a high pressure shaft 8 surrounding the previous shaft between the low pressure compressor 1 and the high pressure turbine 5, supports the mobile blades of the high pressure compressor 2 and the high pressure turbine 4 to form a high pressure body. The two shafts 7 and 8 are concentric and aligned with the X-X axis. The engine is completed by a starter 9 capable of turning the high pressure shaft 8 through a first transmission 10, and an electricity generator 11 driven by the high pressure shaft 8 through a second transmission 12 and that supplies the electricity necessary for aircraft loads (equipment and ancillaries), therefore drawing off some of the energy generated by the engine during operation. A speed reduction unit can be inserted between the fan 6 and the low pressure compressor 1 to reduce the rotation speed of the former relative to the rotation speed of the latter, and to hope to improve overall system performances; but since this device is not hybrid, it only comprises a single operating mode (apart from starting).

Figure 2:
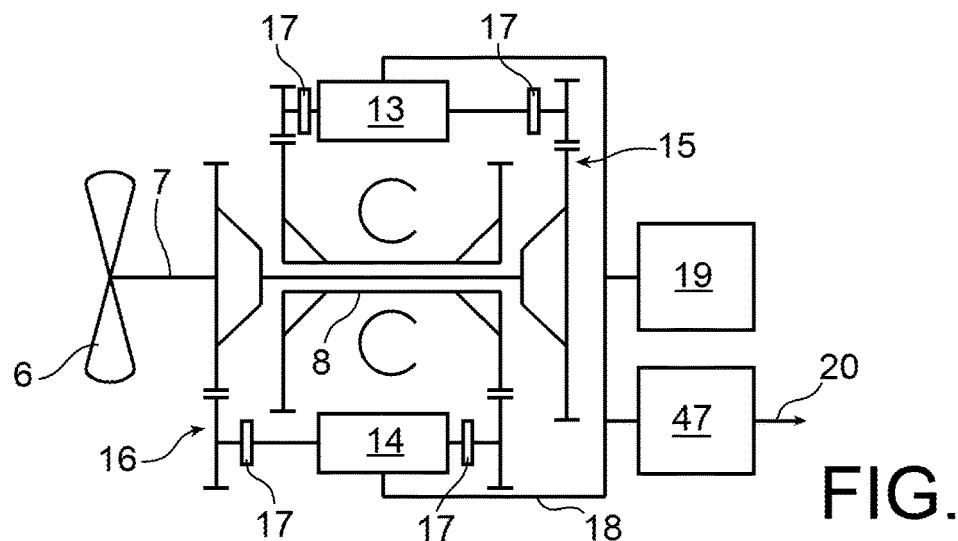
FIG. 2 illustrates a hybrid propulsion device that is not conforming with the invention.

One possible engine propulsion hybridisation device with which several particular operating modes can be obtained is illustrated on FIG. 2 and consists of replacing the starter 9 and the generator 11 by reversible electrical machines 13 and 14 respectively, and to add two additional transmissions 15 and 16 connecting the electrical machines 13 and 14 respectively to the low pressure shaft 7. In order to prevent blockages by static indeterminacy, all transmissions 10, 12 and 15, 16 are provided with a decoupling element 17 so that each electrical machine 13 or 14 can be connected in rotation to not more than one of the shafts 7 and 8. The electrical machines 13 and 14 are also electrically connected through a network 18 to a common battery in addition to also being connected to aircraft loads through another part of the network 20 and current converters 47. Therefore this device can draw power from each of the shafts 7 and 8, or on the contrary can supply power to them, simultaneously or by transferring mechanical power from one of the shafts 7 or 8 to the other through the two electrical machines 13 and 14, charging or discharging the battery 19, or in the latter case, possibly without charging or discharging them. But it is clear that this device is heavy and complicated in practice and that the control or correct setting of the decoupling elements 17 can be difficult.

Now refer to FIG. 3. The invention uses the conventional elements of a thermal turbomachine, namely the low pressure compressor 1, the high pressure compressor 2, the combustion chamber 3, the high pressure turbine 4, the low pressure turbine 5, the fan 6, the low pressure shaft 7 and the high pressure shaft 8; this engine can be a turbojet or a turboprop; and the other principal elements of the invention are a first reversible electrical machine 23 connected to a forward part 24 of the low pressure shaft 8 through a first transmission 25, a second reversible electrical machine 21 connected to the high pressure shaft 8 through a second transmission 22, a dedicated electrical network 26 connecting the electrical machines 21 and 23 to a common battery 27 (or to separate batteries) and to aircraft loads through another part of the network 28 and current converters 48, and finally a single-directional free-wheel clutch 28 separating the forward part 24 from the principal part of the low pressure shaft 7; the free-wheel clutch 29 is oriented such that it is released and becomes free if the speed ratio between the forward part 24 and the rest of the low pressure shaft 7 exceeds a threshold, and otherwise transmits the movement with the effect that the fan 6 will remain fixed to the low pressure body in general, but it can rotate independently from it if a higher speed is imposed on it by the first electrical machine 23. The speed ratio threshold at which the states of the free-wheel clutch 29 are switched can be different from 1 if a speed reducer is attached to it. The transmissions 22 and 25 are completely devoid of coupling elements, enabling selective uncoupling and are therefore composed particularly of gears, imposing an invariable and permanent speed ratio between the rotors of the electrical machines 21 and 23, and the high pressure shaft 8 and the forward part 24 respectively. The electrical machines 21 and 23 are controlled independently of each other between the motor and generator states. They are also mechanically disconnected from each other, the second being completely independent of the rotation of the low pressure shaft 7 and its forward part 24, and the first 23 completely independent of the rotation of the high pressure shaft 8.

Figure 4:
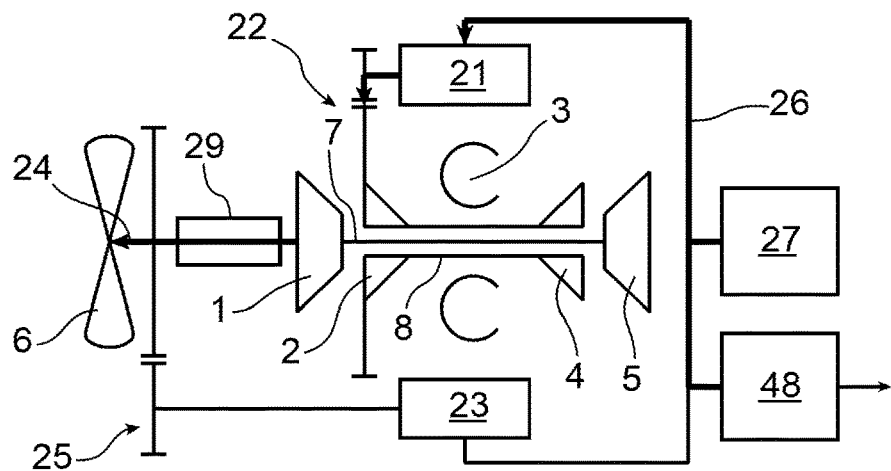

The principal operating modes of this hybrid device will now be described with reference to the following figures, in the approximate order that they are used during a real flight. The first, represented in FIG. 4, is to start the turbomachine that was initially stopped, the second electrical machine 21 drawing off electrical energy from the battery 27 to drive the high pressure shaft 8. This mode can occur in flight, to restart the turbomachine.

Figure 5:
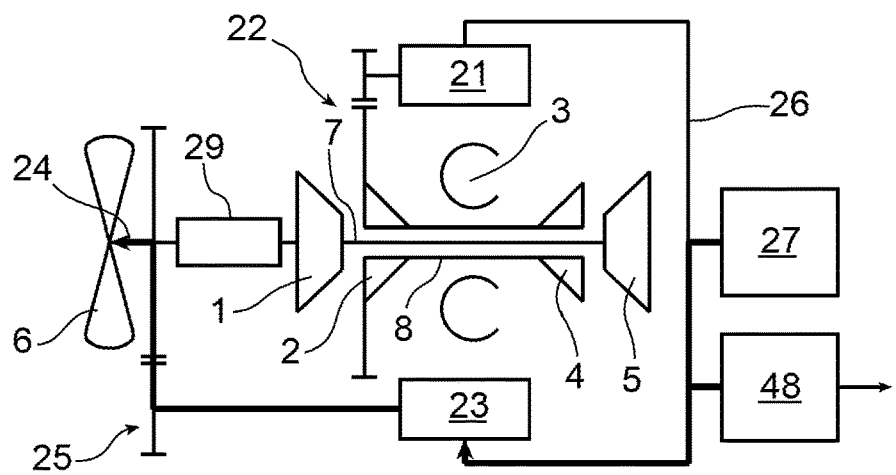

However, a pure electrical mode can be used beforehand, for example for taxiing movements on the ground. FIG. 5 shows that the battery 27 is then used to power the first electrical machine 23 and to turn the fan 6, the rest of the motor (and particularly the part of the low pressure shaft 7 that is beyond the free-wheel clutch 29 towards the aft end of the device) remaining at rest due to release of the free-wheel clutch 29, which therefore avoids any loss of power by making the low pressure shaft 7 turn for no purpose at no load.

This mode can also be used for landing on the ground, or during the descent before landing if it is acceptable to stop the turbomachine. Use of this pure electrical mode will then be particularly interesting to save fuel and can therefore increase the action range of the aircraft.

Figure 6:
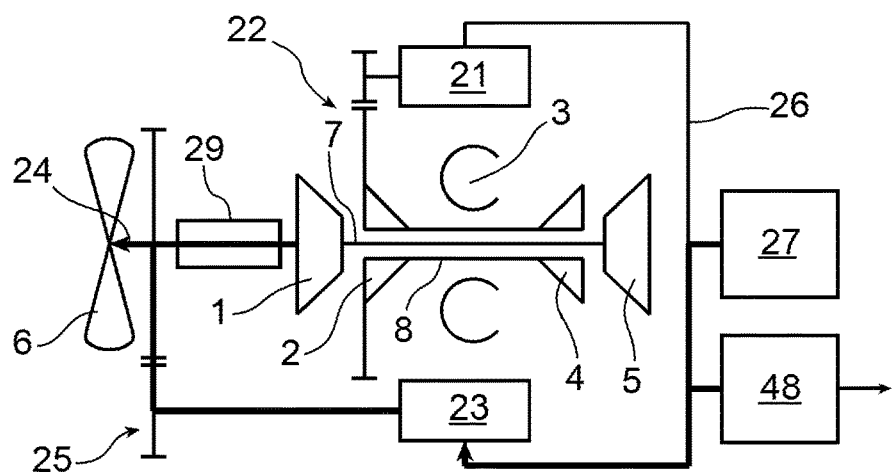

When the turbomachine has been started and takeoff initiated, the mode in FIG. 6 could be preferred: the thrust available due to combustion of fuel is reinforced by an additional thrust exerted by the first electrical machine 23 on the fan 6, the free-wheel clutch 29 being a movement transmitter. Therefore it is a mode in which the conventional thrust obtained by fuel combustion in the chamber 3 is combined with thrust from the purely electric mode described in FIG. 5. Therefore the mode in FIG. 6 can improve the performances of the aircraft that is useful during takeoff and climbing.

Figure 7:
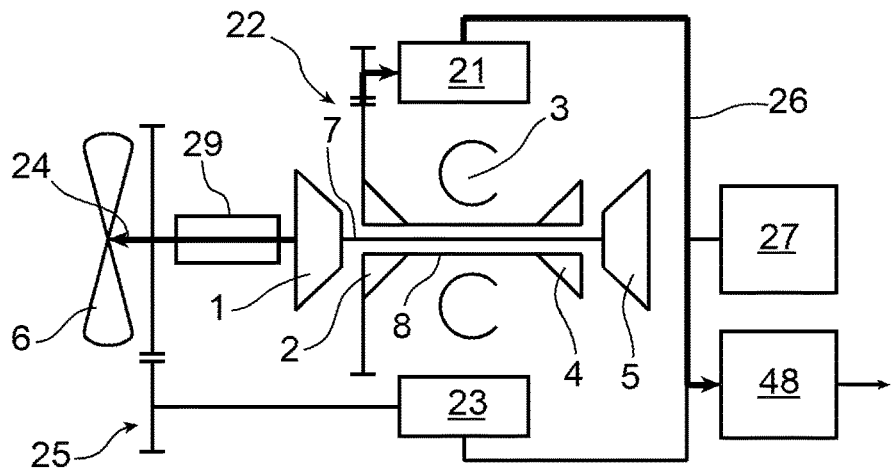
Figure 8:
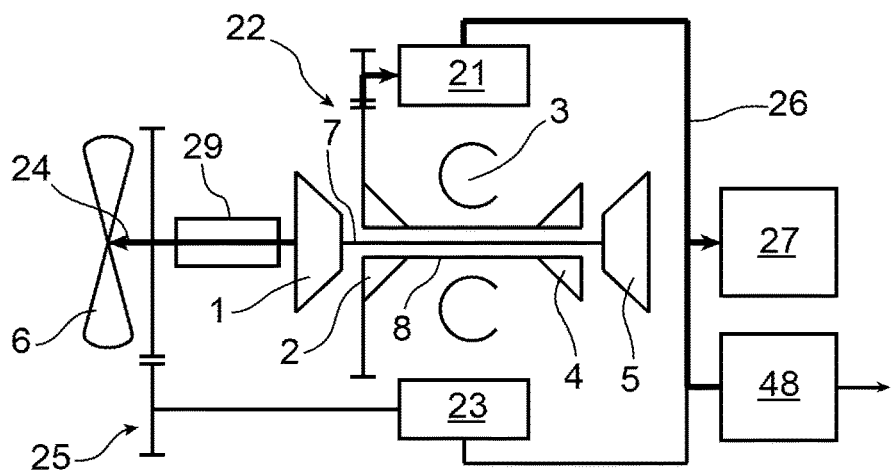

When cruising speed is reached, either of the modes in FIGS. 7 and 8 can be chosen depending on the case, in which the first electrical machine 23 becomes inactive, the free-wheel clutch 29 remains transmitter of the rotation movement from the low pressure shaft 7 to the fan 6, and the second electrical machine 21 operates as an electricity generator to supply power to aircraft equipment and ancillaries, without recharging the battery 27 (FIG. 7), or on the contrary recharging it (FIG. 8), then drawing off greater power from the turbomachine. Either of these modes may be preferred depending on the predicted use of the battery 27; if the battery 27 does not need to be recharged in flight, and particularly if it is planned to replace it with a fully recharged battery after landing, the mode in FIG. 7 will be preferred.

Figure 9:
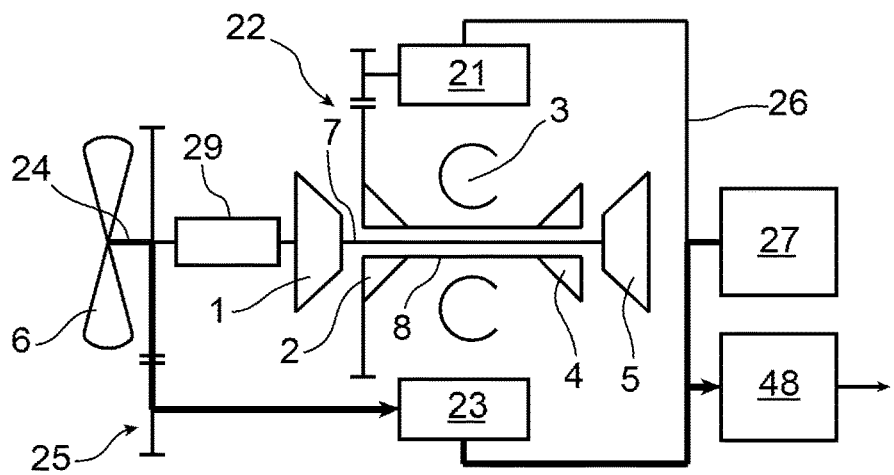
Figure 10:
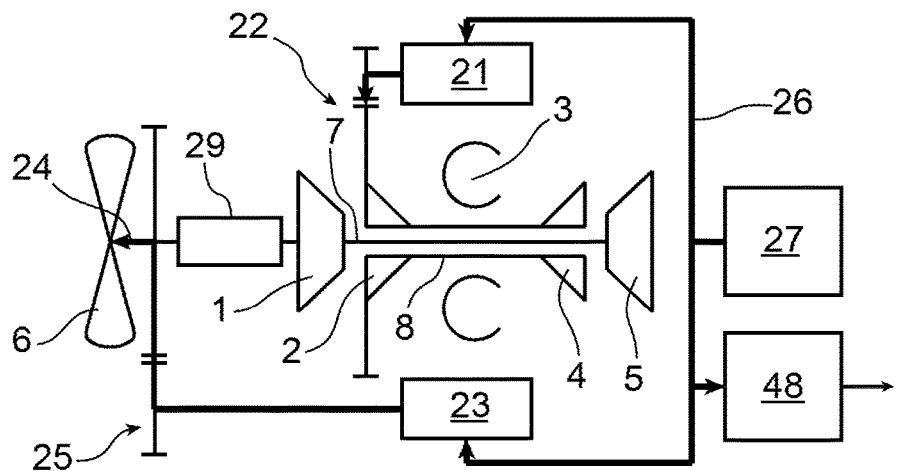

One particular mode is described in FIG. 9; it can be applied if the turbomachine is stopped in flight by a failure resulting from the battery 27 being completely discharged, and it can be used to quickly recharge the battery. Since the turbomachine is then stopped, self-rotation of the fan 6 is used to make the first electrical machine function as a generator and recharge the battery 27 while supplying electricity to the remainder of the aircraft. The free-wheel clutch 29 is then released, therefore once again rotation of the fan 6 leaves the low pressure shaft 7 aft from the free-wheel clutch 29 immobile, and there is no loss of mechanical energy.

One important final mode (FIG. 10), called air-brake mode, can be applied towards the end of the descent when it is required to slow the aircraft quickly without stopping the turbomachine. The two electrical machines 21 and 23 operate in motor mode and therefore drive the high pressure shaft 8 and the fan 6 respectively. However, the fan thrust was inverted; if the pitch of its blades (in other words their direction of lateral inclination) can be inverted so that this thrust inversion can take place. Variable pitch propellers or fans are routinely produced in prior art and will not be described further herein.

FIG. 11 illustrates different modes during a real flight. The necessary phases of a flight are shown on this figure, without excluding movements on the ground before takeoff and after landing. Notations F.4 to F.10 mean that the state of the figure with the corresponding number can be applied. Other flight conditions are obviously possible depending on the circumstances, or even in the case of an engine failure. Therefore one advantage of the invention is to facilitate takeoffs and more vertical climbs, and landings and more vertical descents, and also to increase the range between two landing points. However, use of the more characteristic modes of the invention will not always be preferred; it will also be possible to choose different propulsions for engines on the same aircraft and thus obtain attenuated characteristics of the different modes: FIG. 11 thus illustrates (in F5+F6) a less vertical takeoff and climb variant in which only one engine is in operation according to FIG. 6, and another according to FIG. 5; and a less vertical descent) or an interrupted descent) at the end of the flight, in this case only one engine is in operation according to FIG. 5, and the other is in operation according to FIG. 6; therefore this mixed mode can be used for two opposite flight phases.

FIGS. 12, 13 and 14 illustrate a particular construction, characteristic of the invention and that can be used to accentuate some of the advantages mentioned above. The case of the device is divided and comprises a principal portion 40, in particular surrounding the compressors 1 and 2, the combustion chamber 3 and the turbines 4 and 5, and the second electrical machine 21, and a forward portion 41 surrounding the forward portion 24 of the low pressure shaft 7, the first electrical machine 23, the free-wheel clutch 29, and surrounding or not surrounding the fan 6. The principal portion 40 is rigidly mounted onto the engine suspension pod 42 to the aircraft, and the forward portion 41 is connected to it by an arm 43 and a hinge 44 with a transverse horizontal axis (when the aircraft is in its non-inclined state) mounted in the pod 42. FIG. 12 represents the system in its normal state, in which the portions 40 and 41 of the case are consecutive and prolong each other. But if a rotation is applied to the arm 43 by an engine 45 that can be housed inside the pod 42, the forward portion 41 can be inclined forwards and upwards until (FIG. 13) the fan 6 is directed upwards and with a vertical axis, or even to a state (FIG. 14) in which the forward portion 41 accomplishes a half-turn, placing the fan 6 outside the pod 42, while restoring a horizontal axis to it.

In the states in FIGS. 13 and 14, rotation of the fan 6 is only possible by the first electrical machine 23, the low pressure shaft 7 then being divided into two separate portions that prolong and reconnect each other (making use of a coupling 46 appropriate to their junction) only by returning to the state in FIG. 12. One of the portions, the forward portion, is mounted on the forward portion 41 of the case particularly with the fan 6 and the first electrical machine 23, and the other of the portions, the aft portion, of the low pressure blade 7 is mounted on the principal portion 40 of the case.

In the position in FIG. 13, actuation of the fan 6 produced by the first electrical machine 23 would have the consequence of producing a climb thrust component on the aircraft, therefore with the advantageous consequence of a facilitated takeoff and climb. One operating mode similar to that in FIG. 6 could be envisaged, in which the thermal combustion engine and the fan both contribute to the thrust. The position in FIG. 14, in which a half-turn was applied to the fan 6, would be useful to make it produce a thrust inversion enabling air brake mode without needing to modify the blade pitch.

What is claimed is:

1. Hybrid propulsion device for an aircraft, comprising a turbomachine on which a low pressure shaft (7) is installed, the low pressure shaft (7) carrying a fan (6) located at the turbomachine air intake, a reversible electrical machine (23) associated with the low pressure shaft (7) by a mechanical movement transmission (25), a single-directional clutch (29) located on the low pressure shaft (7) between the fan (6) and a low pressure compressor (1), wherein the low pressure shaft is composed of two separable and reconnectable portions prolonging each other, the device comprises a case composed of two portions (40, 41), a first of said portions of the case (41) is free to tilt about a horizontal transverse axis of the aircraft relative to a second (40) of said portions of the case, one of said portions of the low pressure shaft, the fan (6) and the reversible electrical machine (23) are mounted on the first portion of the case (41), and the other of said portions of the low pressure shaft is mounted on the second portion of the case (40).

2. Hybrid propulsion device according to claim 1, wherein the clutch (29) is a passive free-wheel device, the clutch (29) changing from a solidarisation state to a released state to increase a ratio between a rotation speed of the fan and a rotation speed of the low pressure compressor, the reversible electrical machine being connected at the transmission (25) to the low pressure shaft between the fan (6) and the clutch (29), and associated by an electrical link (26) with a battery (27) of the aircraft.

3. Hybrid propulsion device according to claim 1, wherein the fan (6) has variable pitch blades with inversion of the thrust direction.

4. Hybrid propulsion device according to claim 1, wherein said ratio is equal to 1.

5. Hybrid propulsion device according to claim 1, wherein the turbomachine is provided with a high pressure shaft (8), a second reversible electrical machine (21) is associated with the high pressure shaft (8) by a second mechanical movement transmission (22), the electrical machines associated with the low pressure shaft and the high pressure shaft being controlled independently into a generator state or a motor state.

6. Hybrid propulsion device according to claim 5, wherein the second reversible electrical machine (21) is also associated with said battery (27) by an electrical link (26).

7. Hybrid propulsion device according to claim 1, wherein the second reversible electrical machine (21) is completely separate from the low pressure shaft (7), the reversible electrical machine (23) associated with the low pressure shaft is completely separate from the high pressure shaft (8) and the mechanical movement transmissions (22, 25) associated with the low pressure shaft and the high pressure shaft are devoid of any coupling means.

* * * * *